May 20, 1958     K. B. MacDOUGALL     2,835,354
SLACK TAKE-UP MECHANISM
Filed May 2, 1955                     2 Sheets-Sheet 1
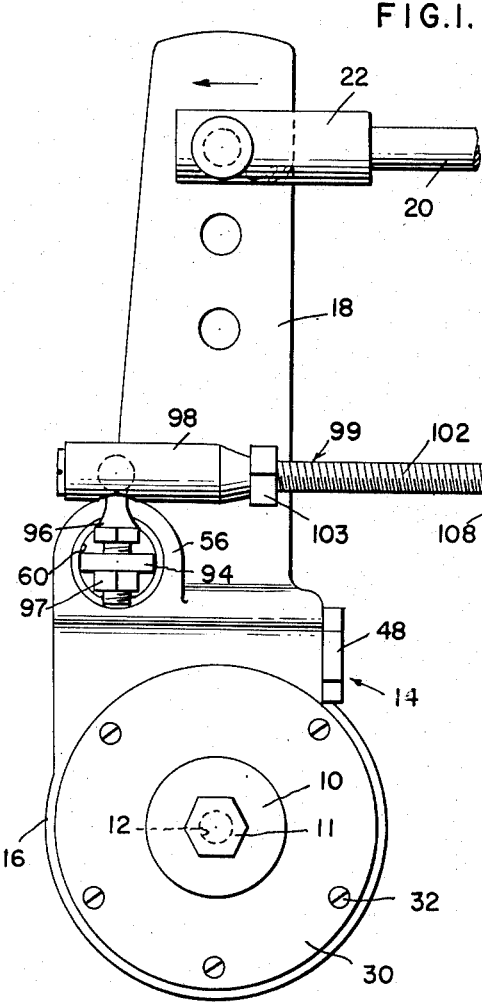
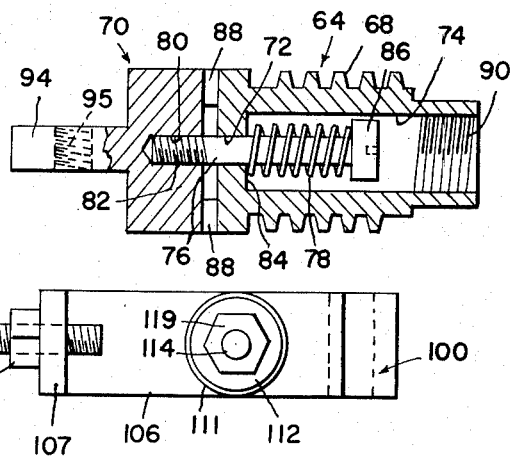
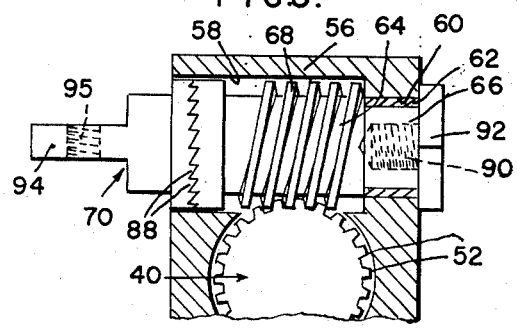
Inventor
Kirkland B. MacDougall
By Shoemaker & Mattare
ATTYS.

May 20, 1958
K. B. MacDOUGALL
2,835,354
SLACK TAKE-UP MECHANISM
Filed May 2, 1955
2 Sheets-Sheet 2
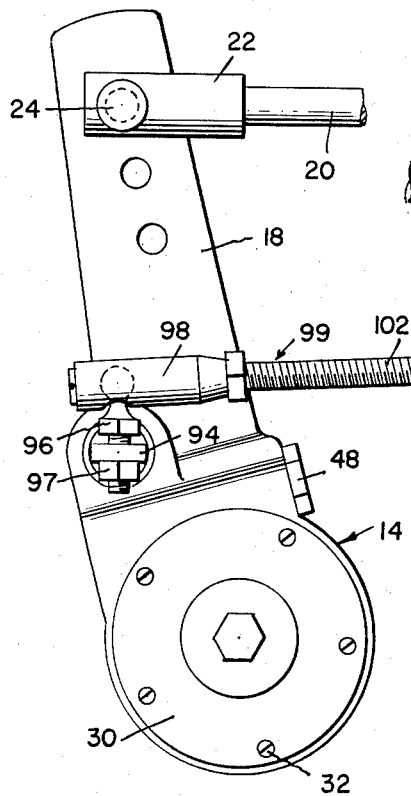
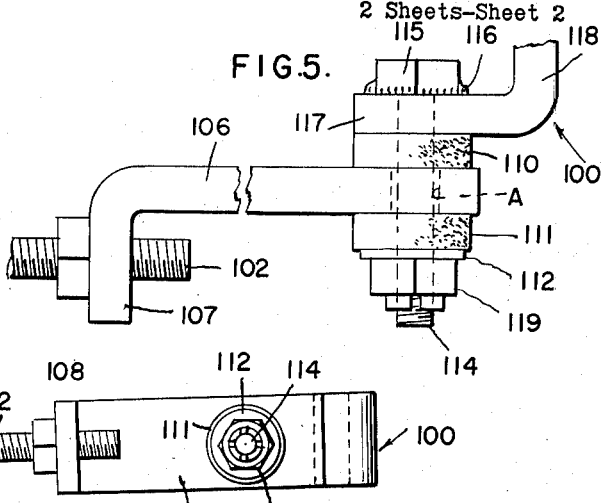
Inventor
Kirkland B. MacDougall
By Shoemaker & Mattare
ATTYS.

United States Patent Office 2,835,354
Patented May 20, 1958

2,835,354

SLACK TAKE-UP MECHANISM

Kirkland B. MacDougall, Benton, Pa.

Application May 2, 1955, Serial No. 505,256

6 Claims. (Cl. 188—196)

This invention relates to mechanism for automatically taking up the slack in the actuating linkage of mechanically actuated brakes for vehicles, such as the heavy duty cam operated brakes commonly used on trucks, buses, trailers and the like.

Large heavy vehicles frequently utilize power operated, mechanically actuated brake systems, the usual type employing the cam acting between the free ends of anchored or floating brake shoes to spread such ends apart upon brake actuation and urge the shoes into engagement with the rotating brake drum. As a general rule, the brakes on these vehicles are power operated by means of positive air pressure, vacuum or the like and the mechanical linkage thereof usually consists of a fluid motor having a plunger or piston rod extending therefrom which is connected by a suitable actuating arm to the brake cam shaft. Such vehicles being heavy, will encounter rapid brake lining wear particularly during prolonged use and also, prolonged use of the brakes will heat the brake drums such that they will expand and cause undue motion in the brake linkage system.

This invention forms an improvement over my co-pending application Serial No. 343,331, filed March 19, 1953, now Patent 2,752,009, and of primary importance with regard to this invention is the provision of means by which slack is automatically taken up in mechanical linkage of power operated brakes but wherein the take-up is not so drastic as to cause binding of the brakes subsequent to cooling of the brake drums. With present take-up adjuster mechanisms, it sometimes occurs that the brake drums expand to such an extent that an undue amount of automatic take-up is effected which, when the brake drums have cooled to their normal operating temperature, will cause binding or setting of the brakes. This condition will sometimes occur after the vehicle has been operated over long downhill routes and can exist at any time subsequent to a long downhill grade which necessitates frequent and prolonged use of the brakes, this sometimes effecting a brake drag which may prevent operation of the vehicle until the brakes are adjusted down.

The means by which this invention accomplishes a more suitable slack take-up resides in the construction employing two worm gear reductions between the automatic slack take-up actuating mechanism and the mechanism by which the assembly is attached to the brake cam shaft. The invention employs essentially a ratcheted worm shaft whose action is dependent upon the amount of movement or throw of the normal brake actuator linkage such that when the throw of this linkage becomes greater than a predetermined amount, the ratchet mechanism will operate to advance the take-up adjustment usually one step or if the brake lining is very far from the correct adjustment, the take-up mechanism may advance several steps. Each such step is of lesser intensity than that which is accomplished by conventional present constructions and, therefore, the less drastic action attained thereby permits the brake actuating cam to be adjusted more finely than can otherwise be accomplished.

One result of this finer adjustment is that the brakes on the several wheels of a given vehicle will all be adjusted nearly equal. It is apparent that with an automatic adjuster one brake could accomplish an adjustment and have a minimum stroke while another brake on the same vehicle was approaching the point of adjustment and therefore have a longer stroke. Now with automatic adjusters as described herein, this difference in the length of the stroke will be negligible.

However, with an automatic adjuster with fewer and therefore larger increments of adjustment the difference in adjustment of the brakes of a given vehicle could be objectionable.

Another object of this invention is that with more and finer adjustments, use of the brakes on a long hill, resulting in heated and expanded drums, will not cause the brakes to become tight when the drums have cooled. With expanded drums the automatic feature of the adjuster is brought into use.

With a few and larger increments of adjustment this can result in tight brakes when the drums are cooled. With the adjuster described herein the adjustment at all times is more nearly in keeping with the wear of the brake lining and will not result in over adjustment.

In the drawings:

Fig. 1 is an elevational view showing the automatic take-up mechanism in operative position;

Fig. 2 is an elevational view with portions thereof broken away showing the secondary worm shaft and its relationship to the other parts of the invention;

Fig. 3 is an enlarged vertical section taken substantially along the plane of section line 3—3 of Fig. 2;

Fig. 4 is an enlarged longitudinal section taken through the ratchet assembly;

Fig. 5 is a top plan view on an enlarged scale showing the manner in which the take-up link is secured to the vehicle frame;

Fig. 6 is a view similar to Fig. 1 but showing the position and relationship of parts during the application of the vehicle brakes; and Fig. 7 is an elevational view showing a modified form of actuating linkage.

Referring now more particularly to Fig. 1, the mechanism shown therein is in the same general relationship of parts with the vehicle structure as is illustrated and described in my co-pending application Serial No. 343,331, filed March 19, 1953, now Patent 2,752,009, and in this figure the reference character 10 indicates the brake actuating cam shaft conventionally associated with the vehicle brakes with the retaining bolt which is usually associated therewith indicated by reference numeral 11. The opening 12 in the end of the cam shaft is threaded for reception of such retaining bolt as will be clearly evident.

The invention itself embodies an actuating arm assemblage which is mounted upon the cam shaft 10 and which is designated generally by the reference character 14. The arm assemblage includes a body portion 16 and upstanding therefrom an elongate actuating arm 18 which may have one or more apertures therein by means of which the brake actuating rod 20 is connected to such arm. The direction of the arrow in Fig. 1 indicating motion of the rod 20 is that direction in which the rod is moved when the brake mechanism is applied and is attendant upon manipulation of the usual foot brake pedal in the vehicle cab.

The manner of connection between the brake rod 20 and the arm 18 is by any suitable means such as the clevis 22 and the clevis pin 24, all of which is conventional generally in the brake art. The body 16 has a transverse bore 26 therein which rotatably receives an internally splined worm gear 28 which is adapted to engage the cam shaft 10 and rigidly interconnect these two parts. An end cover 30 is rigidly secured to the body by means of a plurality of fasteners 32 on one side of the body and at the opposite side there may be employed a similar cover, the purpose of these two covers being to retain the worm gear 28 in proper position within the bore 26 and keep out foreign material and also to retain lubricant within the housing. An intermediate portion of the body above the bore 26 is provided with a secondary passageway or bore having a larger portion 34 and a reduced end portion 36, the latter of which may be bushed as indicated by the reference character 38. A secondary worm shaft 40 is rotatably journaled within this bore and as seen it includes an enlarged portion 42 disposed within the bore portion 34 and a reduced end portion 44 journaled in the bushing 38. The reduced end 44 is provided with a counterbored aperture 46 tapped for the reception of a retaining bolt member 48 in the manner shown. The retaining bolt maintains the worm shaft against longitudinal movement within the body as will be clearly apparent. As desired, a thrust washer 50 may be employed between the body and the worm shaft at the juncture of the enlarged and reduced end portions 42 and 44 thereof.

The end of the worm shaft opposite the reduced end portion 44 is provided with worm wheel teeth 52 whereas the intermediate portion thereof is provided with the worm spiral 54, the latter of which mate and engage with worm gear teeth 55 formed on the outer circumference of the worm gear 28. To seal the opening O in the housing which is necessary to permit the worm shaft 40 to be inserted, a felt ring or washer W is placed against the end of the shaft 40 and held in place by the metal disc D and the split snap ring R, the latter of which fits within the annular groove G.

The uppermost portion of the body 56 is provided with a further bore 58 having a reduced portion 60 which may have therein a bushing 62 in the manner indicated most clearly in Fig. 3. A ratcheting worm shaft 64 is rotatably received in the bore 58 and a reduced end portion 66 of this shaft is journaled in the bushing 62 as shown. The worm shaft 64 has a worm spiral 68 formed thereon which engages and mates with the previously mentioned worm wheel teeth 52 on the secondary worm shaft 40. A take-up ratchet member 70 is operatively associated with the ratchet worm shaft 64 by the means employed as shown in Fig. 4, wherein it will be seen that the worm shaft 64 is provided with an aperture 72 and a counterbore 74 which receives therein the securing bolt 76 and the ratchet spring 78. The inner end face of the ratchet 70 is provided with a tapped hole 80 into which the threaded end 82 of the securing bolt 76 is bottomed. When the bolt is thus bottomed the coil spring 78 which is interposed between the surface 84 and the head 86 of the bolt is compressed a substantial amount but not to such an amount that it will not permit separation of the two members 70 and 64. The abutting faces of the members 64 and 70 are provided with the one-way ratchet teeth 88 as will be seen most clearly in Fig. 3, such that it will be apparent that relative slippage between these parts can be had in one direction of rotation of the two relative to each other whereas the two are coupled together in the opposite direction of rotation.

The outermost portion of the counterbore 74 is threaded as indicated by the reference character 90 for the reception of the retaining bolt 92. This bolt 92 prevents longitudinal movement of the worm shaft 64 and also provides an extended portion on which to engage a wrench in manual adjustment. In adjusting the brakes Up the ratchet will disengage and reengage and the worm can be rotated as desired. When adjusting the brakes Down the ratchet is separated by using a screwdriver or other suitable tool behind the extended portion of ratchet 70 thus permitting the worm shaft to be rotated and the brakes backed off as desired.

The ratchet 70 has a projecting end portion 94 provided with a vertical transverse bore 95 which is threaded to receive the threaded end of a ball stud member 96, the lock nut 97 being utilized to firmly affix the ball stud to the projection 94. The ball end of the stud is received within a socket member 98 which forms a portion of a connecting link member 99 which is disposed substantially horizontally and projects from the ball stud 96 to a point of connection with a generally L-shaped bracket 100 which is rigidly secured to some convenient stationary portion of the vehicle. The link 99 consists of the previously mentioned socket portion 98 and the threaded shank 102 which is threadedly engaged therewith and rigidly joined thereto by means of the lock nut 103. The overall length of the link 99 can be varied by loosening lock nut 103 and threading the shank 102 into or out of the socket 98. The link 99 also includes an L-shaped strap member 106 having a bent end portion 107 which is provided with a threaded aperture receiving the free end of threaded shank 102 opposite socket 98. The adjustment between shank 102 and the strap member 106 is maintained by lock nut 108.

The purpose of the link 99 is to retain the projecting portion 94 of the ratchet in a substantially horizontal position or in that position shown in Fig. 1 at all times so that if the stroke of the brake actuating plunger 20 becomes excessive, one or more of the ratchet teeth will slide past each other and permit the take-up action to take place, this action, of course, occurring during the return stroke of the brake actuating rod 20.

The link 106 is connected to the L-shaped bracket 100 by virtue of the bolt 114 the head 115 of which is preferably welded as at 116 to one leg 117 of the bracket 100, the other bracket leg 118 being that which is rigidly attached to the vehicle. The threaded portion of the bolt 114 projects through a suitable aperture A in the link 107 and a retaining nut 119 is engaged on the threaded shank on the bolt. Preferably, the nut 119 is of the castellated type and has associated therewith a cotter pin to prevent the nut from backing off during service. Preferably also, a pair of rubber washers 110 and 111 are disposed between the link 107 and bracket 100 and the link 107 and nut 119 respectively, with a metal washer 112 between washer 111 and nut 119. Thus, since the aperture A is larger than the shank of bolt 114, a slight amount of lost motion is had therebetween.

By varying the size or length of the aperture A, more or less lost motion can be secured between the link 99 and bracket 100, this being adjusted to obtain the normal working stroke of the brake actuating rod 20.

It will be apparent that each gear reduction between the worm 68 and the worm wheel 52 on one hand and the worm 54 and the worm gear on the other hand is substantially such that the overall gear reduction between the worm shaft 64 and the worm gear 28 is of a high order. Thus, one ratchet step of rotation of the worm shaft 64 will effect a relatively minute corresponding rotation of the worm gear 28 to thus effect the adjustment of the brake actuating mechanism, the cam shaft 10, by only a very slight amount.

Fig. 6 shows the position of the parts after and during application of the vehicle brake and this figure is intended to show a sufficient movement of the actuating rod 20 such as will effect sufficient relative rotation between the ratchet 70 and the ratchet worm shaft 64 so that the teeth interconnecting the same will have slipped past but one step. If this action occurs, it will be apparent that when the brake mechanism is released and returns to the position shown in Fig. 1, the rigid link 99 will force a partial rotation of the ratchet worm shaft 64 an amount corresponding to the relative rotation had between the ratchet 70 and the worm shaft 64 as was effected in the Fig. 6 position. This will effect a very slight movement of the worm gear 28 in the direction indicated by the arrow in Fig. 2 and will thus effect a take-up adjustment on the brake actuating cam shaft 10. Thus, it will be readily apparent that the take-up which is automatic in response to an abnormal completed cycle of brake application and release is very gradual and is not at all harsh or drastic as would effect too great a slack take-up.

Referring now more particularly to Fig. 7, a modified form of actuating linkage is shown. In this case the linkage for operating the ratchet 70 is associated directly with the brake actuating rod 20. An extension 120 is made on one leg of the clevis 22 and such may be made either by welding the portion 120 as at 121 or the parts may be integrally formed as desired. The extension 120 is provided with a series of apertures 122 through any one of which a pivot bolt 123 is projected and this pivot bolt in association with a retaining nut 124 is utilized to pivotally connect the upper end of an idler link 125 to the extension 120. The lower end of the idler link 125 is pivotally connected with the actuating arm 126 by means of a pivot bolt 127 and its associated retaining nut 128 and the actuating arm 126, like the extension 120, is provided with a series of apertures 129 through any one of which the pivot bolt 127 may be projected. The assembly 14 remains the same as described above with the exception that the ratchet portion 70 terminates not in the projecting portion 94 as previously described, but preferably in a cylindrical end portion 131 which is projected through the end 130 of the actuating arm 126 and welded thereto as at 132 so as to obtain a rigid connection between the ratchet portion 70 and actuating arm 126. With the linkage connected as thus described, when the brake actuating rod 20 is operated to the left in Fig. 7, there will be effected a net rotational movement between the two ratchet parts 64 and 70 which is clockwise in direction and, if the stroke of the brake actuating rod 20 is of sufficient extent, one or more of the ratchet teeth will slip past each other and upon the return stroke of the brake actuating rod a take-up adjustment will be effected within the mechanism 14 as previously described.

By varying the connection of the idler link 125 between the extension 120 and the actuating arm 126 through the use of the various apertures 122 and 129, a quicker or slower take-up action in relation to the length of stroke of the brake actuating rod can be accomplished, the same being adjusted as desired to suit the particular brake assembly upon which the adjuster is utilized.

In any event, it is of primary importance that any adjustment which is effected by the mechanism 14 be the least drastic which will still effect the desired results inasmuch as it is all important to make very fine individual adjustments in the brake linkage assembly so that the adjusting effect is progressive and is more nearly equal on all wheels of the vehicle with which the adjuster is associated. That is, with the adjuster as herein described, each adjustment is of very small magnitude and is nearly the amount needed to account for the actual wear of the lining to provide for smooth and even take-up and maintain the brake mechanism in proper operating condition so that the brakes will operate smoothly and evenly.

I claim:

1. In a slack adjusting mechanism for vehicle brakes, an actuating arm assemblage comprising a body portion and an elongate actuating arm integral with the body portion, a first bore in the body portion, an internally splined worm gear rotatably mounted in said bore and adapted to receive therethrough a brake-actuating cam shaft, the actuating arm being adapted for connection with a means for rocking the housing and the associated brake-actuating cam shaft, a second bore in the body portion extending across the turning axis of the worm gear and opening into the upper part of the first bore, a third bore in the body portion above and extending across one end of the second bore and opening downwardly thereinto, a secondary worm shaft rotatably mounted in the second bore and carrying a worm spiral through the major part of its length having driving connection through the first named opening with the worm gear, a worm wheel constituting the remaining part of the length of the secondary worm shaft with the threads extending into the second named opening, a main worm shaft rotatably mounted in the third bore and having driving connection with the worm wheel through the second mentioned opening, ratchet teeth formed on one end of the main worm shaft, a driving ratchet in and turnable relative to the third bore and having operative connection with the ratchet teeth, and means for holding said ratchet against turning as the housing is rocked on the axis of the splined worm gear.

2. The invention according to claim 1, wherein the said second bore is of reduced diameter at one end, the second bore being open at both ends, the other end of the second bore being of a diameter to permit insertion of the secondary worm shaft thereinto, the secondary worm shaft having a reduced axial extension at the end remote from the worm wheel and said extension being rotatably journaled in the reduced end of the second bore, and removable means in and closing the said other end of the second bore.

3. The invention according to claim 2, wherein the secondary worm shaft, the worm spiral thereon and the worm wheel are formed as a unit with the spiral terminating at the side of the worm wheel, the worm wheel having a side face remote from the spiral and forming the end of the unit, and the said removable means comprising a washer fitted in the second bore against said side face of the worm wheel, a retaining disk partitioning the second bore and engaging against the washer and a snap ring in an annular groove in the wall of the second bore and engaging the outer face of the disk.

4. The invention according to claim 2, with a retaining bolt removably secured to said reduced axial extension of the secondary worm shaft and coupling the worm shaft with the body portion and maintaining the secondary worm shaft against longitudinal movement.

5. The invention according to claim 1, wherein the last mentioned means includes an actuating arm rigid with said driving ratchet, an idler link pivotally connected at one end to the actuating arm and an extension link pivotally connected to the other end of said idler link.

6. The invention according to claim 1, wherein the said second and third bores are of a reduced diameter at one end and are open at both ends, the other end of the second and third bores being of a diameter to permit the insertion thereinto respectively of the secondary worm shaft and the main worm shaft, the secondary worm shaft and the main worm shaft each having a reduced axial extension at one end rotatably journaled in the reduced ends of their respective bores, removable means in and closing the said other end of the second bore, and said driving ratchet lying in the said other end of the third bore, and means yieldingly retaining the driving ratchet in operative connection with the ratchet teeth.

References Cited in the file of this patent

UNITED STATES PATENTS

| | | |
|---|---|---|
| 2,554,064 | Shields | May 22, 1951 |
| 2,648,996 | MacDougall | Aug. 18, 1953 |
| 2,752,009 | MacDougall | June 26, 1956 |